United States Patent
Nomura et al.

(10) Patent No.: US 8,026,948 B2
(45) Date of Patent: Sep. 27, 2011

(54) IMAGING APPARATUS AND PORTABLE DEVICE AND PORTABLE TELEPHONE USING SAME

(75) Inventors: Kazuo Nomura, Shiojiri (JP); Hiroyuki Yokoyama, Suwa (JP)

(73) Assignee: Seiko Epson Corporation (JP)

( * ) Notice: Subject to any disclaimer, the term of this patent is extended or adjusted under 35 U.S.C. 154(b) by 382 days.

(21) Appl. No.: 12/400,215

(22) Filed: Mar. 9, 2009

(65) Prior Publication Data

US 2009/0174783 A1 Jul. 9, 2009

Related U.S. Application Data

(62) Division of application No. 11/311,803, filed on Dec. 19, 2005, now Pat. No. 7,522,826.

(30) Foreign Application Priority Data

Dec. 28, 2004 (JP) .................................. 2004-379217
Dec. 28, 2004 (JP) .................................. 2004-379218

(51) Int. Cl.
*H04N 5/228* (2006.01)
(52) U.S. Cl. ............. 348/208.2; 348/222.1; 348/208.12; 348/208.13; 348/333.11
(58) Field of Classification Search ............... 348/222.1, 348/208.2, 208.12, 208.13, 333.11; 396/53, 396/55
See application file for complete search history.

(56) References Cited

U.S. PATENT DOCUMENTS 6,118,485 A 9/2000 Hinoue et al.
6,738,169 B1 5/2004 Nakase
6,900,831 B2 * 5/2005 Nishiwaki .................. 348/208.5
2001/0002142 A1 5/2001 Akiyama et al.
2001/0033303 A1 10/2001 Anderson
(Continued)

FOREIGN PATENT DOCUMENTS

JP 07-322117 12/1995
(Continued)

OTHER PUBLICATIONS

Communication from European Patent Office re: related application, U.S. Appl. No. 11/311,803, filed Apr. 3, 2006.

*Primary Examiner* — Yogesh Aggarwal
(74) *Attorney, Agent, or Firm* — Harness, Dickey & Pierce, P.L.C.

(57) ABSTRACT

An imaging apparatus includes an imaging part that images a subject to generate image data, an image storage part that temporarily stores original image data that was imaged by the imaging part, an image data size reducing part that forms image data for display by reducing the size of image data stored in the image storage part, and an image display part that displays image data for display that was formed by the image data size reducing part; the imaging apparatus further comprising a camera shake state detection part that detects a camera shake occurrence state of the imaging part, a camera shake decision part that decides whether or not camera shake occurred for image data for display that was reduced by the image data size reducing part based on a camera shake state that was detected by the camera shake state detection part, and a camera shake correction part that, when a result decided by the camera shake decision part is that a camera shake occurrence state exists, subjects the image data for display to camera shake correction and displays corrected image data for display on the image display part.

8 Claims, 7 Drawing Sheets

U.S. PATENT DOCUMENTS

2002/0008765 A1  1/2002  Ejima et al.

FOREIGN PATENT DOCUMENTS

| JP | 11-088810 | 3/1999 |
| JP | 11-095307 | 4/1999 |
| JP | 2001-28699 | 1/2001 |
| JP | 2001-086345 | 3/2001 |
| JP | 2004-088567 | 3/2004 |
| JP | 2004-266648 | 9/2004 |
| JP | 2004-364019 | 12/2004 |

* cited by examiner

IMAGING APPARATUS AND PORTABLE DEVICE AND PORTABLE TELEPHONE USING SAME

This application is a divisional of U.S. patent application Ser. No. 11/311,803 filed on Dec. 19, 2005. This application claims the benefit of Japanese Patent Application No. 2004-379217 filed Dec. 28, 2004 and Japanese Patent Application No. 2004-379218 filed Dec. 28, 2004. The disclosures of the above applications are incorporated herein by reference.

BACKGROUND OF THE INVENTION

1. Field of the Invention

The present invention relates to an imaging apparatus having an imaging part that images a subject and generates image data, and a portable device and a portable telephone that use the imaging apparatus.

2. Description of the Related Art

Electronic cameras are already known that, in order to enable the recording of images without camera shake, prompt the operator to retake an image when the initial imaging was disrupted by camera shake, for example, as disclosed in JP-A-11-88810. These cameras comprise a vibration detection section that detects vibrations of the camera main unit, a shutter speed detection section that detects the shutter speed of the camera, and a warning output section that issues a camera shake warning in accordance with the output of the vibration detection section.

Further, for example as disclosed in JP-A-11-95307, image blur checking devices of cameras are also known that notify an operator when image blur occurred. In this case the camera body comprises a camera control CPU, an image-taking lens and a shutter. The camera CPU outputs information indicating the focal length and shutter speed at the time of imaging to a CPU of the image blur checking device. The CPU of the image blur checking device then starts to read angular velocity data from an H gyro sensor and a V gyro sensor in response to closing of an X contact point, and at the same time the CPU of the blur checking device periodically reads angular velocity data based on interrupt signals from an oscillator to thereby calculate an image blur amount based on the focal length and shutter speed information and the angular velocity data. The image blur checking device only lights an LED to inform the operator that image blur occurred when the image blur amount exceeded a specified value.

Furthermore, for example, as disclosed in JP-A-2004-266648, a camera shake correction apparatus is known that, when camera shake correction mode was selected, automatically increases the shutter speed by n times and also increases the sensitivity by n times. In this case, when the operator presses the shutter button once, imaging of n frames is automatically performed in succession and the amount of deviation of the digital image data that corresponds to the imaged image of each frame is detected. Next, by correcting each digital image data by the amount of the detected deviation and then synthesizing the data to generate digital image data for one frame, in the digital image data that is ultimately generated the noise amount is constant and the camera shake amount is decreased to 1/n.

However, the conventional examples disclosed in the above JP-A-11-88810 and JP-A-11-95307 merely comprise functions that simply notify the user that camera shake occurred in the camera. These conventional examples do not allow a user to check image data in which the camera shake was corrected, and the user has to perform imaging again. When the user cannot perform imaging again, the only method available to the user is to store the image data that was imaged in the camera shake state. There is thus an unsolved problem that user operability is poor.

Further, in the conventional example disclosed in the above JP-A-2004-266648, when the camera shake correction mode is set the shutter speed and the sensitivity are automatically increased and image data of a plurality of images is imaged. However, it is necessary to simultaneously process the image data of the plurality of images that were imaged, and thus the required storage amount and operation amount increases and the time until the image data after correction processing is displayed on a display part lengthens. There is thus an unsolved problem that the user is left with the impression that the correction processing time is long.

The present invention focused on the unsolved problems of the above-described conventional examples, and it is an object of this invention to provide an imaging apparatus that can quickly display an image after camera shake correction to the user, as well as a portable device and a portable telephone that use the same.

SUMMARY

According to a first aspect of this invention, there is provided an imaging apparatus comprising an imaging part that images a subject to generate image data, an image storage part that temporarily stores original image data that was imaged by the imaging part, an image data size reducing part that reduces the size of image data stored in the image storage part to form image data for display, and an image display part that displays image data for display that was formed by the image data size reducing part; the imaging apparatus further comprising a camera shake state detection part that detects a camera shake occurrence state in the imaging part, a camera shake decision part that decides whether or not camera shake occurred in image data for display that was reduced by the image data size reducing part based on the camera shake state that was detected by the camera shake state detection part, and a camera shake correction part that, when the decision of the camera shake decision part is that a camera shake occurrence state exists, subjects the image data for display to camera shake correction and displays the corrected image data on the image display part.

According to this first aspect, when a subject is imaged by an electronic imaging part to generate image data, the image data is temporarily stored in an image data storage part, and at the same, the image data undergoes reduction processing in the image data size reducing part to form image data for display. A decision is made in the camera shake decision part regarding whether or not camera shake occurred for this image data for display. When a camera shake occurrence state exists, the image data for display is subjected to camera shake correction in the camera shake correction part, and is then displayed on the image display part. Thus, since camera shake correction need only be conducted for image data for display that has a small number of pixels, the image data for display that underwent camera shake correction can be displayed on the image display part in a short time. This allows the user to carry out image confirmation in a short time and also makes it possible to shorten the imaging interval when performing consecutive imaging.

According to a second aspect of this invention, there is provided an imaging apparatus comprising an imaging part that images a subject to generate image data, an image storage part that temporarily stores original image data that was imaged by the imaging part, an image data size reducing part that reduces the size of image data stored in the image storage part to form image data for display, and an image display part that displays image data for display that was formed by the image data size reducing part; the imaging apparatus further comprising a camera shake state detection part that detects a camera shake occurrence state of the imaging part, a camera shake decision part that decides whether or not camera shake occurred in image data for display that was reduced by the image data size reducing part based on the camera shake state that was detected by the camera shake state detection part, a camera shake correction part that, when the decision of the camera shake decision part is that a camera shake occurrence state exists, subjects the image data for display to camera shake correction and displays the corrected image data on the image display part, and an original image data storage control part that adds data showing the camera shake state that was detected by the camera shake state detection part to the original image data that was stored on the image storage part and stores the data on a storage medium.

According to this second aspect, similarly to the first aspect, it is possible to display on an image display part in a short time image data for display that was corrected for camera shake. Further, data showing the camera shake state that was detected by the camera shake state detection part is added to the original image data that is temporarily stored on the image storage part and the data is then stored on a storage medium by the original image data storage control part. Thus, it is possible to perform camera shake correction for the original image data on the basis of data showing the camera shake state when playing back the data. It is also possible to significantly decrease the image processing time when conducting imaging with the imaging apparatus.

In the first and second aspects of this invention, by configuring the camera shake occurrence state detection part with a gyro sensor, the angular velocity can be detected using a gyro sensor, thereby enabling accurate detection of the angular velocity of the imaging part and accurate detection of the camera shake state. Further, by configuring the gyro sensor with a fixed substrate composed of a quadrate thin crystal plate, a pair of oscillatory arms for excitation that are disposed in parallel with one of the opposing sides of the fixed substrate through supporting parts, and oscillatory arms for detection that are provided in a connected row arrangement with the other opposing sides of the fixed substrate, it is possible to miniaturize the size of the gyro sensor so that it can be easily mounted on a small portable device such as a digital camera or a portable telephone.

Furthermore, according to a third aspect of this invention there is provided an imaging apparatus comprising an imaging part that images a subject to generate image data, an image storage part that temporarily stores original image data that was imaged by the imaging part, an image data size reducing part that reduces the size of image data stored in the image storage part to form image data for display, and an image display part that displays image data for display that was formed by the image data size reducing part; the imaging apparatus further comprising a camera shake decision part that decides whether or not camera shake occurred in image data that was imaged, a first camera shake correction part that, when the decision of the camera shake decision part is that a camera shake occurrence state exists, subjects the image data for display that was formed by the image data size reducing part to camera shake correction and displays the resulting data on the image display part, and a second camera shake correction part that, while the image data for display is displayed on the image display part by the first camera shake correction part, subjects the original image data to camera shake correction to form corrected image data.

According to this third aspect, when a subject is imaged by an electronic imaging part to generate image data, a decision is made in the camera shake decision part as to whether or not camera shake occurred in the imaged image data. When camera shake occurred, since the first camera shake correction part carries out camera shake correction for image data for display that was formed in the image data size reducing part and displays the data on the image display part, it is possible to reduce the time taken until corrected image is displayed on the image display part. Further, since camera shake correction is carried out for the original image data by the second camera shake correction part while the user is viewing the corrected image, the camera shake correction processing of the original image data can be carried out without the user being made aware of the camera shake correction processing time.

Further, according to a fourth aspect of this invention there is provided an imaging apparatus comprising an imaging part that images a subject to generate image data, an image storage part that temporarily stores original image data that was imaged by the imaging part, an image data size reducing part that reduces the size of image data stored in the image storage part to form image data for display, and an image display part that displays image data for display that was formed by the image data size reducing part; the imaging apparatus further comprising an angular velocity detection part that detects the angular velocity of the imaging part, a camera shake decision part that decides whether or not camera shake occurred in the imaged image data on the basis of the angular velocity that was detected by the angular velocity detection part, a first camera shake correction part that, when the decision of the camera shake decision part is that a camera shake occurrence state exists, subjects the image data for display that was formed by the image data size reducing part to camera shake correction and displays the resulting data on the image display part, and a second camera shake correction part that, while the image data for display is displayed on the image display part by the first camera shake correction part, subjects the original image data to camera shake correction to form corrected image data.

According to this fourth aspect, when image data was generated by imaging a subject with an electronic imaging part, the angular velocity is detected with an angular velocity detection part such as a gyro sensor to decide by means of the camera shake decision part whether or not camera shake occurred in the imaged image data. When camera shake occurred, since the first camera shake correction part carries out camera shake correction for image data for display that was formed in the image data size reducing part and displays the data on the image display part, it is possible to reduce the time taken until corrected image is displayed on the image display part. Further, since camera shake correction is carried out for the original image data by the second camera shake correction part while the user is viewing the corrected image, the camera shake correction processing of the original image data can be carried out without the user being made aware of the camera shake correction processing time.

Furthermore, according to a fifth aspect of this invention there is provided an imaging apparatus comprising an imaging part that images a subject to generate image data, an image storage part that temporarily stores original image data that was imaged by the imaging part, an image data size reducing part that reduces the size of image data stored in the image storage part to form image data for display, and an image display part that displays image data for display that was formed by the image data size reducing part; the imaging apparatus further comprising an angular velocity detection part that detects an angular velocity of the imaging part, a first camera shake decision part that decides whether or not camera shake occurred in the original image data that is stored in the image storage part on the basis of the angular velocity that was detected by the angular velocity detection part, a second camera shake decision part that, when the decision of the first camera shake decision part is that a camera shake occurrence state exists, decides whether or not camera shake occurred for image data for display that was formed by the image data size reducing part, a first camera shake correction part that, when the result decided by the second camera shake decision part is that a camera shake occurrence state exists, subjects the reduced image data to camera shake correction and displays the resulting data on the image display part, and a second camera shake correction part that, while the image data for display is displayed on the image display part by the first camera shake correction part, subjects the original image data to camera shake correction to form corrected image data.

According to this fifth aspect, when it was determined by the first camera shake decision part that camera shake occurred in the original image data, the second camera shake decision part decides whether or not camera shake occurred for the image data for display that was reduced, and when camera shake did not occur the image data for display can be displayed immediately on the image display part. When camera shake did occur, the first camera shake correction part subjects the image data for display to camera shake correction and then displays the data on the image display part, thereby enabling corrected image data for display to be displayed by the image display part in a short time. Since camera shake correction processing is performed on the original image data by the second camera shake correction part to form corrected image data in a state in which the corrected image data for display is displayed on the display part, camera shake correction processing can be carried out for the original image data without the user being made aware of the correction processing time.

In the third to fifth aspects, by configuring the first camera shake correction part such that a camera shake correction mark showing that camera shake correction was performed is displayed together with the corrected image data for display when displaying corrected image data on the image display part after subjecting the image data for display to camera shake correction, the user can recognize that camera shake occurred because a correction mark showing that camera shake correction was performed is displayed together with the corrected image data for display when the image data for display is displayed on the image display part after undergoing camera shake correction.

Further, by configuring the second camera shake correction part such that the corrected image data that was formed is supplied to the image data size reducing part after completing camera shake correction for the original image data, since the corrected image data that was formed is supplied to the image data size reducing part after completing camera shake correction for the original image data at the second camera shake correction part, the corrected image data is reduced to the size of image data for display and displayed on the image display part and thus the user can check the corrected image data.

Furthermore, by configuring the second camera shake correction part so as to display on the image display part, upon completion of camera shake correction for the original image data, a selection display to select whether or not to display the corrected image data that was formed, the user can select whether or not to display the corrected image data since a selection display to select whether or not to display the corrected image data that was formed is displayed on the image display part.

According to a sixth aspect of this invention there is provided a portable device comprising any one of the imaging apparatuses of the first to fifth aspects. Thus, it is possible to display image data for display that underwent camera shake correction processing on an image display part in a short time to allow a user to quickly decide whether or not to store the image data. According to a seventh aspect of this invention there is provided a portable telephone comprising any one of the imaging apparatuses of the first to fifth aspects. It is thus possible to display image data for display that underwent camera shake correction on an image display part in a short time on a portable telephone which is susceptible to camera shake and which also has limited operation capacity, and to allow a user to quickly decide whether or not to store the image data.

DETAILED DESCRIPTION OF THE PREFERRED EMBODIMENTS

Hereunder, embodiments in which this invention is applied to a portable telephone are described based on the drawings.

Figure 1A:
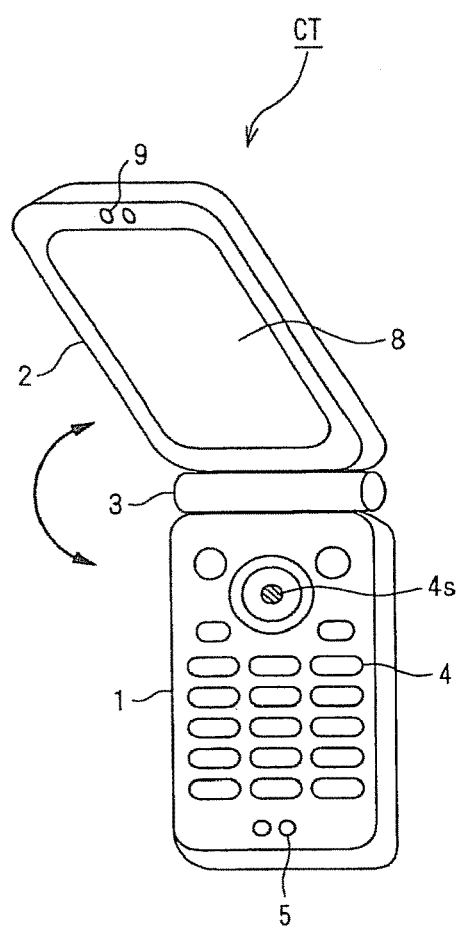
FIGS. 1A and 1B are perspective views showing an embodiment in a case in which the present invention is applied to a portable telephone.
Figure 1B:
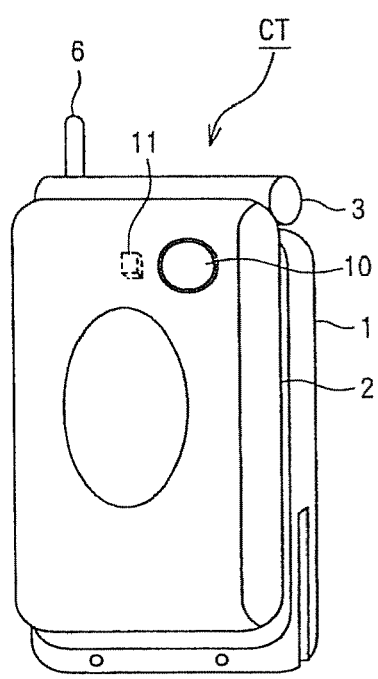

FIGS. 1A and 1B are perspective views showing one embodiment of the present invention. In the figure, reference characters CT denote a portable telephone which has a structure in which a rectangular plate-shaped base member 1 and a cover member 2 that covers the top surface of the base member 1 are linked through a hinge 3 so that they communicate with each other.

As shown in FIG. 1A, on the base member 1 is disposed an operation part 4 that has operation buttons on the top surface thereof, and on the opposite side to the hinge 3 is disposed a microphone 5. Further, as shown in FIG. 1B, an antenna for radio communication 6 that communicates with a radio communication base station is attached at the end face of the hinge 3 side in a condition in which it protrudes externally.

As shown in FIG. 1A, on the cover member 2 an image display part 8 is provided on the side facing the base member 1, and a speaker 9 is provided on the image display part 8 in a position that is opposite the hinge 3. As the image display part 8, for example, a liquid crystal panel, an organic electroluminescent panel or a plasma display panel or the like can be applied.

Further, as shown in FIG. 1B, on the rear surface of the cover member 2 is provided an imaging apparatus 10, and in the vicinity of this imaging apparatus 10 a gyro sensor 11 is provided inside the cover member 2 as an angular velocity detection part.

Figure 2:
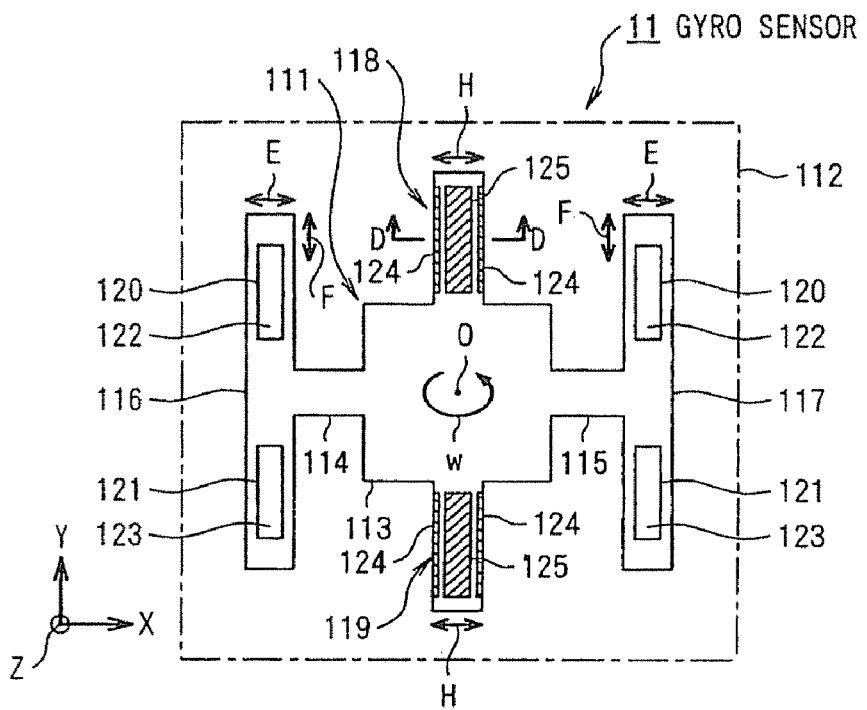
FIG. 2 is a configuration diagram showing a gyro sensor.

As shown in FIG. 2, for this gyro sensor 11 a sensor main unit 111 is housed within a package 112 that uses a piezoelectric material or the like. The inside of the package 112 is formed in a box shape that can house the sensor main unit 111 and comprises a driving section (not shown in the figure) such as an excitation circuit that energizes the sensor main unit 111, and a circuit (not shown) that detects vibrations from the sensor main unit 111.

The sensor main unit 111 comprises a square fixed substrate 113 that was formed in a laminated shape by etching crystal, a pair of oscillatory arms for excitation 116 and 117 that are disposed in parallel with one of the opposing sides of the fixed substrate 113 through supporting parts 114 and 115, and oscillatory arms for detection 118 and 119 that are connected to the other opposing sides of the fixed substrate 113. In each of the oscillatory arms for excitation 116 and 117 are formed long grooves 120 and 121 that are respectively arranged in the lengthwise direction. Inside the grooves 120 and 121 are disposed excitation electrodes 122 and 123 that are of opposite polarity to each other.

In this gyro sensor 11, by applying a driving voltage to the oscillatory arms for excitation 116 and 117 from the excitation circuit (not shown) as a driving section, the ends of the oscillatory arms for excitation 116 and 117 oscillate such that they approach and move away from each other, as shown by the arrows E in FIG. 2. At this time, as shown in FIG. 2, when the angular speed of rotation ω acts around the center O of the fixed substrate 113 in the plane of the drawing, a Coriolis force Fc acts in the direction F of FIG. 2. This oscillation is conveyed to the oscillatory arms for detection 118 and 119 through the supporting parts 114 and 115 and the fixed substrate 113. More specifically, the oscillatory arms for excitation 116 and 117 receive the Coriolis force Fc that acts in the direction of the vector product of the angular speed of rotation ω and the direction of oscillation in the X-axis direction, and are configured to oscillate alternately in the +Y direction and −Y direction along the Y-axis in accordance with the following formula (walk oscillation). This oscillation is conveyed to the oscillatory arms for detection 118 and 119 through the supporting parts 114 and 115 and the fixed substrate 113, and the oscillatory arms for detection 118 and 119 oscillate as shown by the arrows H in FIG. 2.

$$Fc = 2mV \times \omega$$

In this case, m represents the mass of oscillating parts of the oscillatory arms for excitation 116 and 117 and V represents the speed of the oscillatory arms for excitation 116 and 117.

Figure 3:
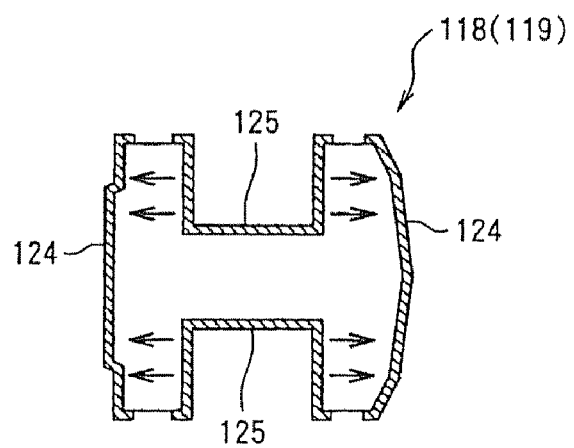
FIG. 3 is a schematic cross section along a line D-D of FIG. 2.

Therefore, for the oscillatory arms for detection 118 and 119, as shown in FIG. 3 which represents a cross section thereof, electrical fields are generated as shown by the arrows between the detection electrodes 124 and the detection electrodes 125 of the oscillatory arms for detection 118 and 119 by oscillation in the H direction of FIG. 2. By extracting as signals the electrical fields that are based on the oscillation of the oscillatory arms for detection 118 and 119, the angular velocity ω can be detected. By use of the gyro sensor 11 having this configuration, a package can be employed with a small angle of about 1 mm to realize a size that can be adequately mounted on the portable telephone CT.

Figure 4:
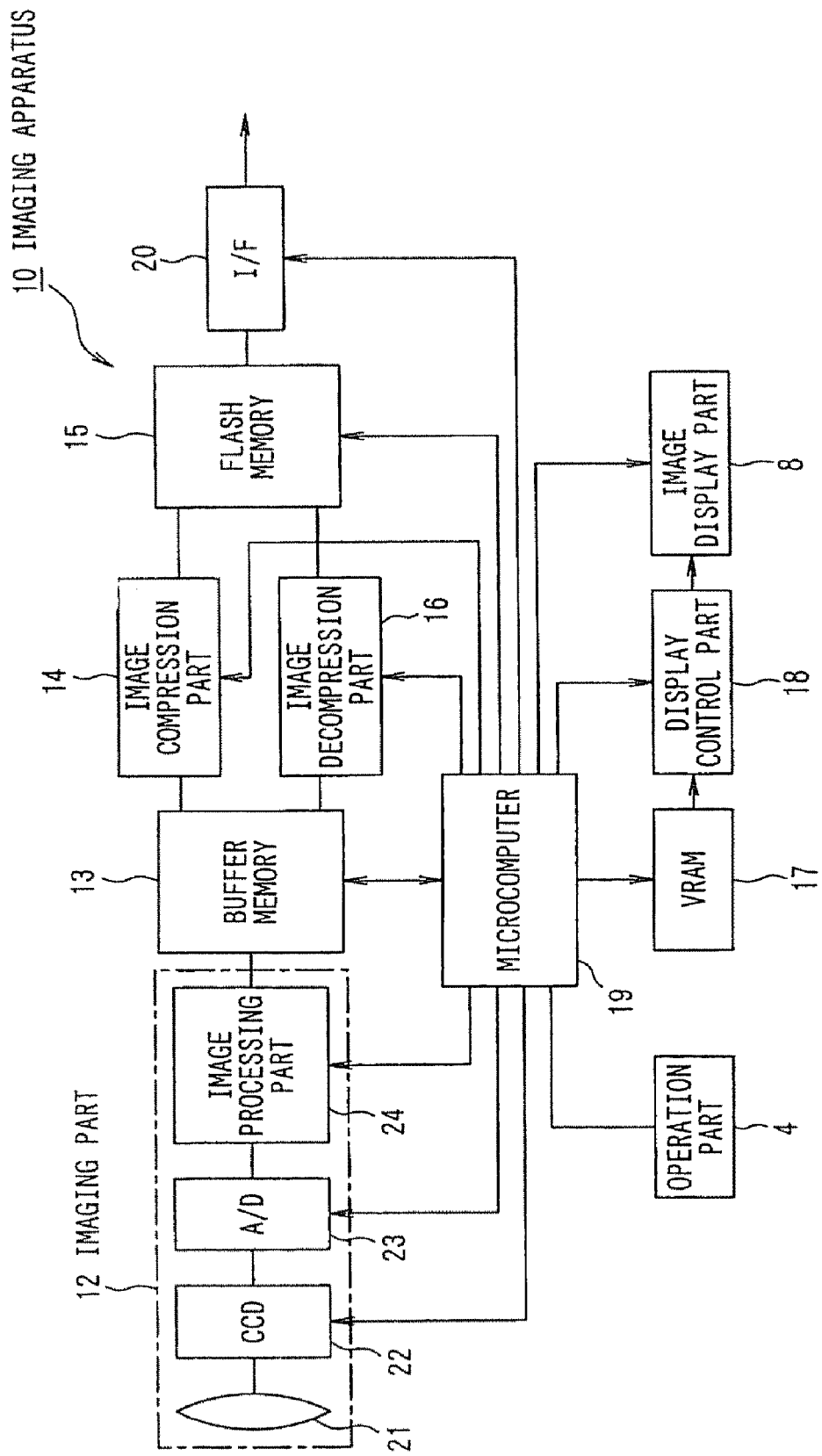
FIG. 4 is a block diagram showing one example of an imaging apparatus.

As shown in FIG. 4, the imaging apparatus 10 comprises an imaging part 12 that images a subject; a buffer memory 13 as an image storage part that comprises a RAM, DRAM or the like that stores original image data output from the imaging part 12; an image compression part 14 that generates compressed image data by, for example, subjecting original image data stored in the buffer memory 13 to image compression processing in JPEG format; a flash memory 15 that stores compressed image data that is output from the image compression part 14; an image decompression part 16 that reads out compressed image data that is stored in the flash memory 15 to perform image decompression in JPEG format and store the data in the buffer memory 13; a VRAM 17 that stores image data for display that was created by reducing the size of image data stored in the buffer memory 13 to a small number of pixels; a display control part 18 that displays image data for display that is stored in the VRAM 17 on the image display part 8; a microcomputer 19 as a control part that controls the imaging part 12, the buffer memory 13, the image compression part 14, the flash memory 15, the image decompression part 16, the VRAM 17 and the display control part 18; and an interface part 20 that outputs image data that is stored in the flash memory 15 to an external personal computer or printer or the like.

The imaging part 12 is configured so that an incident subject image that passed through a lens 21 undergoes photoelectric conversion by a CCD image pickup device 22, an analog signal that underwent photoelectric conversion and was output from the CCD image pickup device 22 is converted to a digital signal by an A/D converter 23 and supplied to an image processing part 24, and this signal then undergoes various kinds of image correction processing such as gamma correction and white balance adjustment at the image processing part before being output to the buffer memory 13.

The buffer memory 13 is configured, for example, to store image data of 1200×1600 pixels, and the VRAM 17 is configured, for example, to store image data for display of 120×160 pixels.

Operation signals input from the operation part 4 and an angular velocity detected by the gyro sensor 11 are input into the microcomputer 19 which executes various programs such as application programs or an operating system stored on a built-in ROM or RAM to control the imaging part 12, the buffer memory 13, the image compression part 14, the flash memory 15, the image decompression part 16, the VRAM 17 and the display control part 18.

Figure 5:
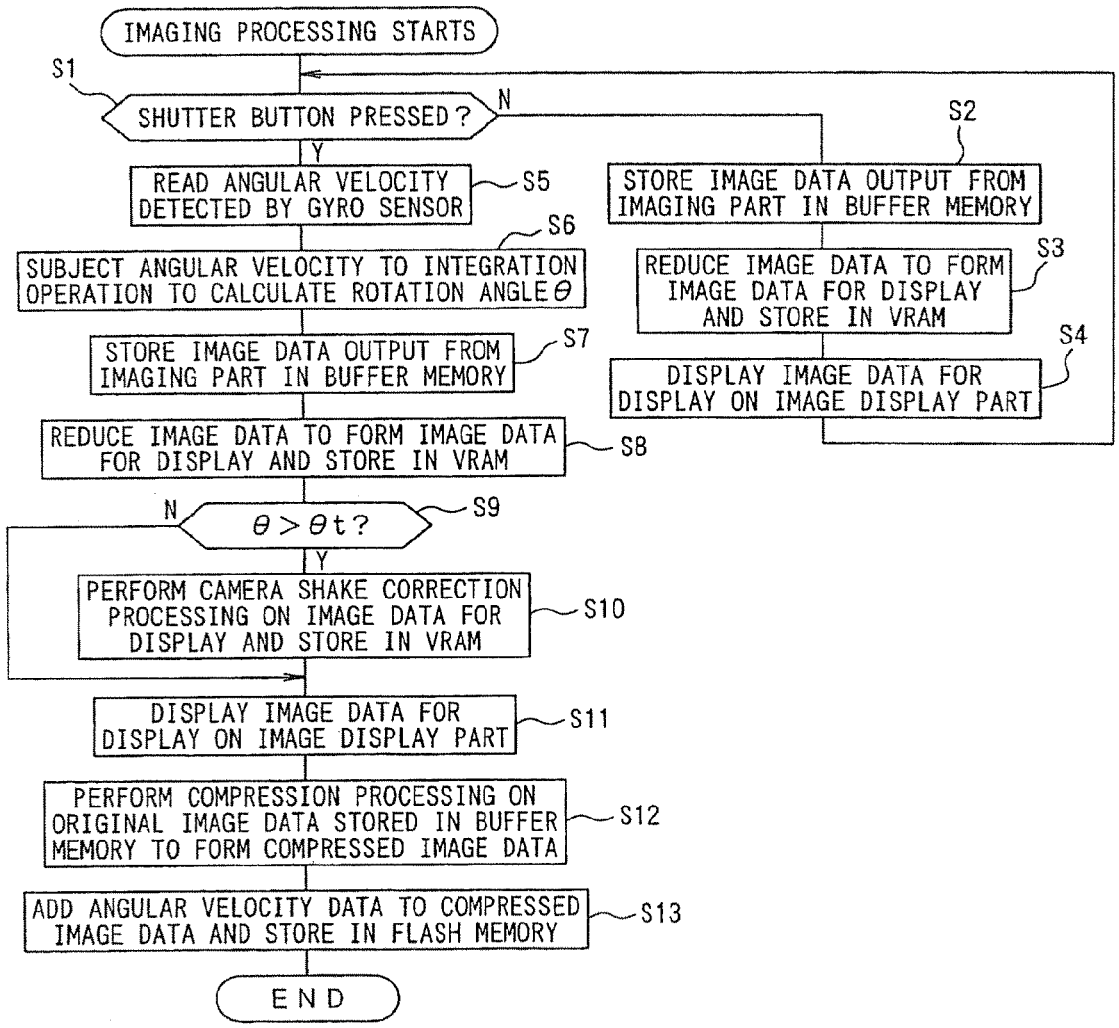
FIG. 5 is a flowchart showing one example of imaging procedures executed by a microcomputer of FIG. 4.

The microcomputer 19 executes the image processing shown in FIG. 5.

Execution of this image processing starts when an imaging mode is selected on the menu screen. First, in step S1, the microcomputer 19 determines whether or not a shutter button 4s was pressed on the operation part 4. When the shutter button 4s was not pressed the processing moves to step S2 to store the image data that was imaged by the imaging part 12 in the buffer memory 13. Next, the processing proceeds to step S3 in which image data that was stored in the buffer memory 13 is reduced to form image data for display and this image data for display is stored in the VRAM 17. Subsequently, in step S4, the image data for display stored in the VRAM 17 is output to the image display part 8 and displayed. The processing then returns to step S1.

When the result of the decision in step S1 is that the shutter button 4s was pressed, the processing moves to step S5 to read the angular velocity that was detected by the gyro sensor 11. Next, in step S6, the read angular velocity is subjected to an integration operation to calculate a rotation angle θ.

In step S7, digital image data that is output from the imaging part 12 is stored in the buffer memory 13 as, for example, still image data of 1200×1600 pixels. The processing then proceeds to step S8 where the still image data stored in the buffer memory 13 is reduced to image data for display of 120×160 pixels and stored in the VRAM 17.

Subsequently, in step S9, the microcomputer 19 determines whether or not the rotation angle θ exceeds a threshold value θt at which camera shake occurs in the reduced image data for display. When θ≦θt the microcomputer 19 decides that camera shake is not visible in the reduced image data for display and jumps to step S11 that is described later.

When the result determined in step S9 is that θ>θt, the microcomputer 19 decides that camera shake occurred for the reduced image data for display and proceeds to step S10. In step S10, the microcomputer 19 performs camera shake correction processing for the image data for display stored in the VRAM 17 based on the rotation angle θ, and then rewrites the corrected image data onto the VRAM 17 before proceeding to step S11.

In step S11, the image data for display stored in the VRAM 17 is output to the image display part 8 to display the data, and the processing then proceeds to step S12.

In step S12, compressed image data is formed by subjecting the original image data stored in the buffer memory 13 to JPEG-format image compression processing using the image compression part 14, and the processing then proceeds to step S13. In step S13, angular velocity data that was detected by the gyro sensor 11 is added to the compressed image data as, for example, metadata, and the resulting data is stored on the flash memory 15, after which the imaging processing ends.

In the processing of FIG. 5, the processing of steps S5 and S6 and the gyro sensor 11 correspond to a camera shake state detection part; the processing of steps S3 and S8 and the VRAM 17 correspond to an image data size reducing part, the processing of step S9 corresponds to a camera shake decision part, the processing of steps S9 and S10 corresponds to a camera shake correction part, and the processing of steps S12 and S13 correspond to an original image data storage control part.

Next, the operation of the above embodiment is described.

The execution of the image processing shown in FIG. 5 starts when the imaging mode is selected from a menu screen on the image display part 8 when the portable telephone CT is in a state, as shown in FIG. 1A, in which the cover member 2 is open with respect to the base member 1

At this time, when the lens 21 is directed towards a subject in a state in which the shutter button 4s is not pressed, an image of the subject passes through the lens 21 to form an image on the CCD image pickup device 22. The subject image then undergoes photoelectric conversion by the CCD image pickup device 22, and after an analog signal output from the CCD image pickup device 22 is converted to a digital signal by the A/D converter 23, image data that underwent various kinds of image correction processing such as gamma correction and white balance adjustment at the image processing part 24 is stored in the buffer memory 13 (step S2). The image data that was stored in the buffer memory 13 is stored in the VRAM 17 as image data for display that underwent reduction processing (step S3), and the image data for display that was stored in the VRAM 17 is displayed on the image display part 8 (step S4).

Therefore, it is possible for a user to consider the picture composition while viewing the subject image displayed on the image display part 8, and when the user presses the shutter button 4s upon deciding the picture composition, a shutter sound is emitted.

Thus, when the shutter button 4s is pressed the processing in FIG. 5 moves from step S1 to step S5 to read the angular velocity detected by the gyro sensor 11 at that time. The rotation angle θ is then calculated by subjecting the thus-read angular velocity to an integration operation (step S6). Next, image data output from the imaging part 12 is stored in the buffer memory 13 as original image data of 1200×1600 pixels (step S7), after which the original image data is subjected to reduction processing to form image data for display of 120×160 pixels to be stored in the VRAM 17 (step S8).

The microcomputer 19 then determines whether or not camera shake occurred in the image data for display formed by reducing the number of pixels of the original image data by $\frac{1}{100}$ that is stored in the VRAM 17 based on the rotation angle θ. When the rotation angle θ is less than or equal to a threshold value θt, the microcomputer 19 determines that even if camera shake occurred in the original image data the camera shake state can not be discerned when the image data for display is displayed on the image display part 8, and the processing thus proceeds to step S11. In step S11, the image data for display that is stored in the VRAM 17 is output as it is to the image display part 8 and displayed. The original image data that is stored in the buffer memory 13 is then supplied to the image compression part 14 to undergo image compression in JPEG format (step S12). Thereafter, the angular velocity that was detected by the gyro sensor 11 is added as metadata to the compressed image data and stored on the flash memory 15 (step S13). At this time, since the image data for display stored in the VRAM 17 is displayed as it is on the image display part 8, it is possible to immediately display an image on the image display part 8.

In contrast, when the rotation angle θ exceeds the threshold value θt, it is determined that camera shake would be recognized if the image data for display that is stored in the VRAM 17 was displayed as it is on the image display part 8. Therefore camera shake correction processing that is based on the rotation angle θ is performed on the image data for display that is stored in the VRAM 17 to form corrected image data for display, and this data is again stored in the VRAM 17 (step S10). The corrected image data for display stored in the VRAM 17 is then output to the image display part 8 to be displayed (step S11).

Since the image data for display stored in the VRAM 17 is data for which the number of pixels was reduced by $\frac{1}{100}$ with respect to the original image data, the correction processing time when performing camera shake correction processing for the image data for display can be made much shorter in comparison with performing camera shake correction processing for the original image data. It is thus possible to display the corrected image data for display on the image display part 8 in a short time. This allows the user to view the corrected image data for display and decide in a short time whether or not to store the original image data.

In this connection, when forming image data for display by conducting size reduction processing after subjecting the original image data to camera shake correction processing based on the rotation angle θ, since the number of pixels of the original image data is 100 times that of the image data for display the camera shake correction processing time is long and the waiting time until the corrected image data for display is displayed on the image display part 8 is also long. Therefore, it is not possible to satisfy a user's desire to immediately view the imaged image, and the waiting time when conducting consecutive imaging is also long.

However, as described in the foregoing, according to this embodiment it is possible to determine whether or not a camera shake state exists in the image data for display, and since, compared to the original image data, it is harder to recognize the occurrence of a camera shake state in the image data for display that is reduced in size in comparison with the original image data, it is possible to set the threshold value when correcting camera shake in the image data for display to a larger value than the threshold value when correcting camera shake in the original image data. As a result, the probability of performing camera shake correction can be reduced for the case of performing camera shake correction for image data for display in comparison to the case of performing camera shake correction for the original image data. More specifically, the probability of outputting the image data for display to the image display part 8 as it is without performing camera shake correction increases, and in this respect also the average time to display an image on the image display part 8 is shortened.

When playing back the compressed image data that is stored in the flash memory 15, the compressed image data is decompressed by the image decompression part 16 to restore the original image data. By storing this data in the buffer memory 13 after performing camera shake correction based on the angular velocity data detected by the gyro sensor 11 that was added to this original image data, and forming image data for display by reducing the corrected image data stored in the buffer memory 13 and then storing the image data for display in the VRAM 17, image data that underwent camera shake correction can be displayed on the image display part 8.

An example of another playback method is one in which the image data for display that underwent camera shake correction is subjected to image compression processing in the image compression part 14 and the compressed data is then stored in the flash memory 15 as dedicated playback data. When the user desires to playback image data that was imaged on the image display part 8, the compressed image data for display is decompressed in JPEG format in the image decompression part 16 to restore the image data for display and this is then stored in the VRAM 17, thereby enabling immediate playback of the image data that was imaged. In this case, since it is possible to omit camera shake correction processing at the time of playing back the original image data, the time until playback display can be shortened.

When the above imaging processing was repeated to store a plurality of compressed image data in the flash memory 15 and a user wants to output to an external PC or printer the compressed image data that was stored, the compressed image data can be output to the PC or printer by transferring thereto the compressed image data that is stored in the flash memory 15 after connecting the PC or printer to the interface part 20, thereby enabling the image data to be displayed on a display device with a large screen that is connected to the PC or to be printed with the printer.

At this time, although the compressed image data comprises original image data for which a camera shake state was not corrected, since the angular velocity data detected by the gyro sensor 11 is added as metadata to this original image data, by pre-installing in the PC or printer an application program that includes playback procedures that are configured to conduct camera shake correction at the time of playback, camera shake correction processing can be conducted based on the angular velocity data when the compressed image data is decompressed to playback the original image data. It is thus also possible to omit camera shake correction processing of original image data by the portable telephone CT, enabling the load of the microcomputer 19 to be reduced by the corresponding amount.

In this connection, although for the above embodiment a case was described in which original image data is stored in the flash memory 15 as it is without performing camera shake correction, even when the necessity exists to subject the original image data to camera shake correction, this invention is not limited thereto. For example, a configuration may be adopted in which, when displaying image data for display on the image display part 8, camera shake correction processing is carried out in the background for the original image data based on the rotational velocity θ, and after the completion of camera shake correction the original image data is then compressed in the image compression part 14 and stored in the flash memory 15.

Further, in the above first embodiment, although a case was described of applying this invention to a portable telephone CT, the invention is not limited thereto, and it can also be applied to an independent imaging apparatus such as a digital camera or a portable device such as a PDA (Personal Digital Assistant).

Furthermore, although in the above first embodiment a case was described in which a gyro sensor 11 was applied as a camera shake state detection part, this invention is not limited thereto and a different angular velocity sensor may be applied. Further, a configuration may also be adopted in which an angular velocity sensor such as the gyro sensor 11 is not used, and image data that was imaged by the imaging part is subjected to software processing to detect a camera shake occurrence state.

Next, the second embodiment of this invention will be described referring to FIG. 6.

According to the second embodiment, when camera shake has occurred the image data for display is subjected to camera shake correction and the corrected image data for display is quickly displayed, while, for the original image data, the original data is corrected while the user is viewing the corrected image data for display.

Figure 6:
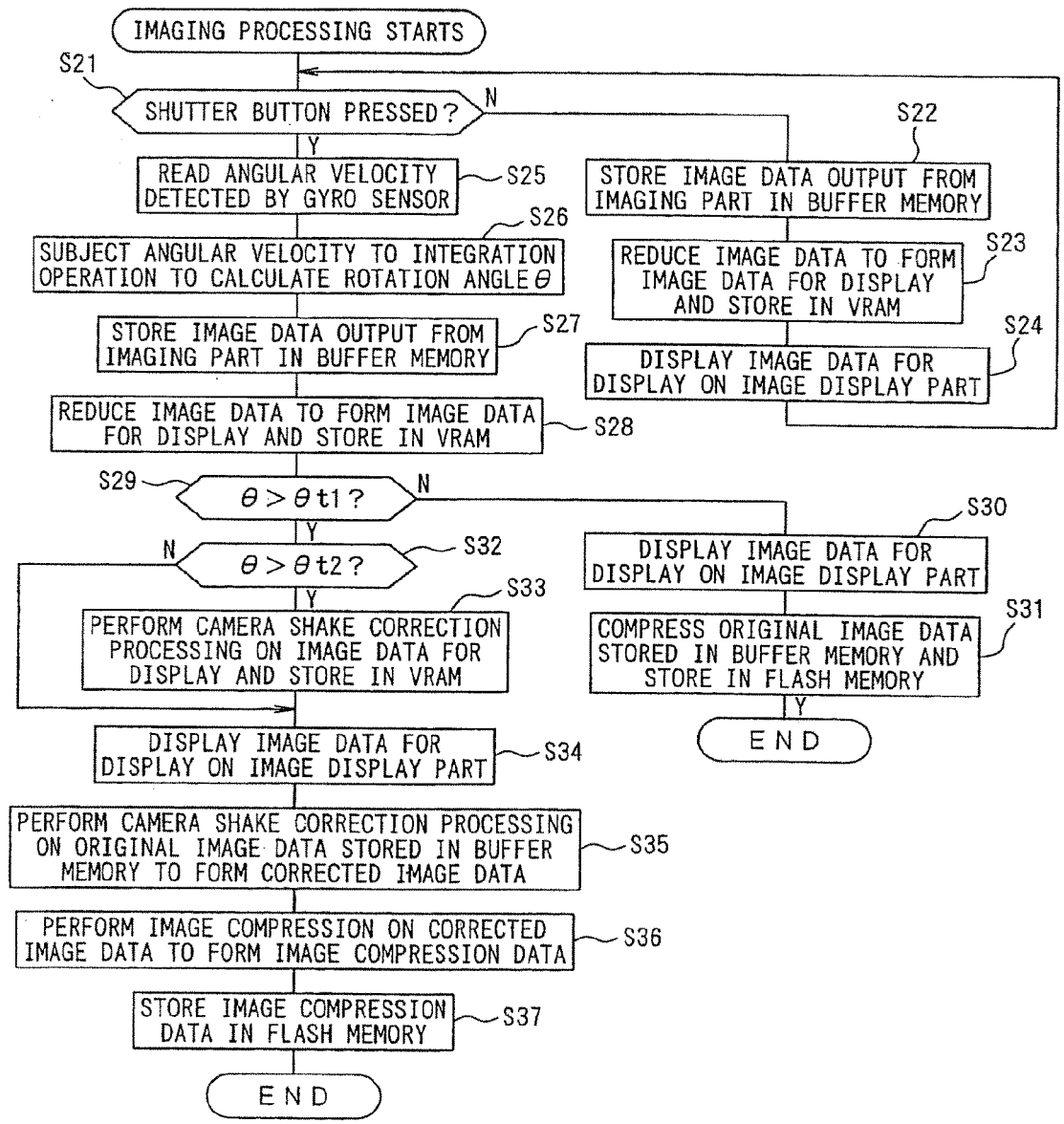
FIG. 6 is a flowchart showing one example of imaging procedures executed by a microcomputer in the second embodiment herein.

More specifically, according to the second embodiment the imaging processing shown in FIG. 6 is executed by the microcomputer 19 of the aforementioned first embodiment.

Execution of this image processing starts when the imaging mode is selected on the menu screen. First, in step S21, the microcomputer 19 determines whether or not the shutter button 4s was pressed on the operation part 4. When the shutter button 4s was not pressed, the processing proceeds to step S22 to store the image data that was imaged by the imaging part 12 in the buffer memory 13. Next, the processing proceeds to step S23 in which image data that was stored in the buffer memory 13 is reduced to form image data for display, and this image data for display is stored in the VRAM 17. Subsequently, in step S24, the image data for display stored in the VRAM 17 is output to the image display part 8 and displayed. The processing then returns to step S21.

When the result of the decision in step S21 is that the shutter button 4s was pressed, the processing moves to step S25 to read the angular velocity that was detected by the gyro sensor 11. Next, in step S26, the read angular velocity is subjected to an integration operation to calculate the rotation angle θ.

In step S27, digital image data that is output from the imaging part 12 is stored in the buffer memory 13 as, for example, still image data of 1200×1600 pixels. The processing then proceeds to step S28 where the still image data stored in the buffer memory 13 is reduced to image data for display of 120×160 pixels and stored in the VRAM 17.

Subsequently, in step S29, the microcomputer 19 determines whether or not the rotation angle θ exceeds a preset first threshold value θt1 at which camera shake occurs in the original image data. When θ≦θt1, the microcomputer 19 decides that camera shake did not occur for the original image data and moves to step S30 to supply the image data for display that is stored in the VRAM 17 to the image display part 8 to be displayed. The processing then proceeds to step S31 where the original image data stored in the buffer memory 13 is supplied to the image compression part 14 and compressed in JPEG format to form compressed image data.

The angular velocity that was detected by the gyro sensor 11 is added to this compressed image data as, for example, metadata, and the resulting data is then stored on the flash memory 15. Thereafter, the imaging processing ends.

In contrast, when the decision in step S29 is θ>θt1, the processing moves to step S32 to determine whether the rotation angle θ exceeds a second threshold value θt2 (>θt1) that is larger than the first threshold value θt1, at which camera shake occurs for the reduced image data for display. When θ≦θt2, the microcomputer 19 decides that camera shake did not occur for the image data for display that was reduced, and the processing then jumps to step S34 that is described later.

When the result of the decision in step S32 is θ>θt2, the microcomputer 19 decides that camera shake occurred for the reduced image data for display and proceeds to step S33. In step S33, the microcomputer 19 performs camera shake correction processing on the image data for display stored in the VRAM 17 based on the rotation angle θ, and then rewrites the corrected data in the VRAM 17 before proceeding to step S34.

In step S34, the image data for display stored in the VRAM 17 is output to the image display part 8 and displayed, and the processing then proceeds to step S35.

In step S35, corrected image data is formed by subjecting the original image data that is stored in the buffer memory 13 to camera shake correction processing based on the rotation angle θ. Next, in step S36, the corrected image data that was formed in the preceding step is supplied to the image compression part 14 to form compressed image data by compressing the image data in JPEG format, and the processing then proceeds to step S37. In step S37, angular velocity data that was detected by the gyro sensor 11 is added to the compressed image data as, for example, metadata, and storage processing is then performed to store the resulting data on the flash memory 15. Thereafter, the imaging processing ends.

In the processing of FIG. 6, the processing of step S22 and the gyro sensor 11 correspond to an angular velocity detection part, the processing of steps S23 and S28 and the VRAM 17 correspond to an image data size reducing part, the processing of steps S29 and S32 correspond to a camera shake decision part, of which the processing of step S29 corresponds to a first camera shake decision part and the processing of step S32 corresponds to a second camera shake decision part, the processing of step S33 corresponds to a first camera shake correction part, and the processing of steps S35 to S37 corresponds to a second camera shake correction part.

Next, the operation of the second embodiment is described.

When the imaging mode is selected from the menu screen on the image display part 8 with the portable telephone CT in a state in which the cover member 2 is open with respect to the base member 1, as shown in FIG. 1A, execution of the imaging processing shown in FIG. 6 starts.

At this time, when the lens 21 is directed towards a subject in a state in which the shutter button 4s is not pressed, an image of the subject passes through the lens 21 to form an image on the CCD image pickup device 22. The subject image is then subjected to photoelectric conversion by the CCD image pickup device 22, and after an analog signal output from the CCD image pickup device 22 is converted to a digital signal by the A/D converter 23, image data that underwent various kinds of image correction processing such as gamma correction and white balance adjustment at the image processing part 24 is stored in the buffer memory 13 (step S22). The image data that was stored in the buffer memory 13 is then stored in the VRAM 17 as image data for display that underwent reduction processing (step S23). The image data for display that was stored in the VRAM 17 is then displayed on the image display part 8 (step S24).

It is therefore possible for a user to consider the picture composition while viewing the subject image displayed on the image display part 8, and when the user presses the shutter button 4s upon deciding the picture composition, a shutter sound is emitted.

Thus, when the shutter button 4s is pressed the processing in FIG. 6 moves from step S21 to step S25 to read the angular velocity detected by the gyro sensor 11 at that time. The rotation angle θ is then calculated by subjecting the thus-read angular velocity to an integration operation (step S26).

Next, image data output from the imaging part 12 is stored in the buffer memory 13 as original image data of 1200×1600 pixels (step S27), after which the original image data is subjected to reduction processing to form image data for display of 120×160 pixels to be stored in the VRAM 17 (step S28).

The microcomputer 19 then determines whether or not camera shake occurred for the original image data stored in the buffer memory 13 based on the rotation angle θ. When the rotation angle θ is less than or equal to a first threshold value θt1, the microcomputer 19 determines that camera shake did not occur for the original image data and proceeds to step S30 to output the image data for display that is stored in the VRAM 17 to the image display part 8 to be displayed. Subsequently, in step S31, the original image data that is stored in the buffer memory 13 is supplied to the image compression part 14 to undergo image compression in JPEG format, and the angular velocity detected by the gyro sensor 11 is added as metadata to the compressed image data and the resulting data is stored in the flash memory 15.

However, when the decision in step S29 is that the rotation angle θ exceeds the first threshold value θt1, it is determined that camera shake occurred for the original image data, and the microcomputer then determines whether or not the rotation angle θ exceeds a second threshold value θt2 (step S32).

When the rotation angle θ is less than or equal to the second threshold value θt2, the microcomputer 19 determines that it is not possible to discern a camera shake state when the image data for display for which the number of pixels was reduced by 1/100 with respect to the original image data is displayed on the image display part 8, and thus displays the image data for display that is stored on the VRAM 17 on the image display part 8 as it is. Since the image data for display that is stored on the VRAM 17 is displayed on the image display part 8 as it is (i.e. without correction), it is possible to immediately display the image data on the image display part 8.

While the image data for display is being displayed on the image display part 8, camera shake correction processing based on the rotation angle θ is executed in the background on the original image data that is stored in the buffer memory 13 (step S35). When the camera shake correction processing for the original image data ends, the corrected image data is supplied to the image compression part 14 to form compressed image data (step S36), and angular velocity data that was detected by the gyro sensor 11 is added as metadata to this compressed image data and the data is then stored on the flash memory 15 (step S37).

Accordingly, it is possible to complete camera shake correction processing for the original image data while the user is viewing the image data for display that is displayed on the image display part 8 and deciding whether or not to store the data. Thus, camera shake correction processing can be completed without the user being conscious of the time-consuming camera shake correction processing of the original image data.

However, when the rotation angle θ exceeds the second threshold value θt2 the microcomputer 19 determines that camera shake would be discernable if the image data for display stored in the VRAM 17 was displayed as it is on the image display part 8. Therefore, corrected image data for display is formed by subjecting the image data for display stored in the VRAM 17 to camera shake correction processing based on the rotation angle θ, and this corrected data is stored in the VRAM 17 (step S33). This corrected image data for display stored in the VRAM 17 is then output to the image display part 8 to be displayed (step S34).

Since the image data for display stored in the VRAM 17 is data in which the number of pixels was reduced by 1/100 with respect to the original image data, the correction processing time when performing camera shake correction processing for the image data for display can be made much shorter in comparison to the time required when performing camera shake correction processing for the original image data. It is thus possible to display the corrected image data for display on the image display part 8 in a short time, thereby enabling the corrected image data for display to be displayed on the image display part 8 without the user being aware of the time required to perform camera shake correction.

Then, while the corrected image data for display is being displayed on the image display part 8 and the user is viewing the corrected image data for display and deciding whether or not to store the data, camera shake correction processing based on the rotation angle θ can be completed in the background for the original image data that has a large number of pixels and which is stored in the buffer memory 13. Thus, the time-consuming camera shake correction processing of the original image data can be completed without the user being aware that it is taking place.

When the above imaging processing is repeated to store a plurality of compressed image data in the flash memory 15 and a user wants to output to an external PC or printer the compressed image data that was stored, the compressed image data can be output to the PC or printer by connecting the PC or printer to the interface part 20 and transferring thereto the compressed image data stored in the flash memory 15. Thus, the image data can be displayed on a display device with a large screen that is connected to the PC or can be printed with the printer.

According to the above second embodiment, when it is necessary to perform camera shake correction on original image data that was imaged by the imaging part 12, it is determined whether or not camera shake correction is necessary for image data for display formed by reducing the original image data, and when camera shake correction is not necessary the image data for display is displayed immediately on the image display part 8. When camera shake correction is required, corrected image data for display that was formed by performing camera shake correction processing on image data for display that has a small number of pixels can be displayed on the image display part 8 in a short time. In either case, while the image data for display is being displayed on the image display part 8, camera shake correction processing is performed for the original image data with a large number of pixels that requires time for correction processing, and the corrected original image data is then stored in the flash memory 15. Therefore, it is possible to display image data for display that underwent camera shake correction on the image display part in a far shorter time compared to the case of subjecting original image data to camera shake correction and then forming image data for display based on the corrected original image data and displaying that image data for display on the image display part. Further, camera shake correction can be performed for the original image data without the user being aware of the time required for the camera shake correction processing.

Furthermore, the configuration is one in which, when the necessity has arisen to perform camera shake correction on the original image data, a decision is made as to whether or not camera shake correction is necessary for image data for display that was formed by reducing the original image data. Therefore, when camera shake correction is not required for the image data for display the image data for display can be displayed as it is on the image display part 8. This allows the image to be displayed on the image display part 8 without any waiting time.

Figure 7:
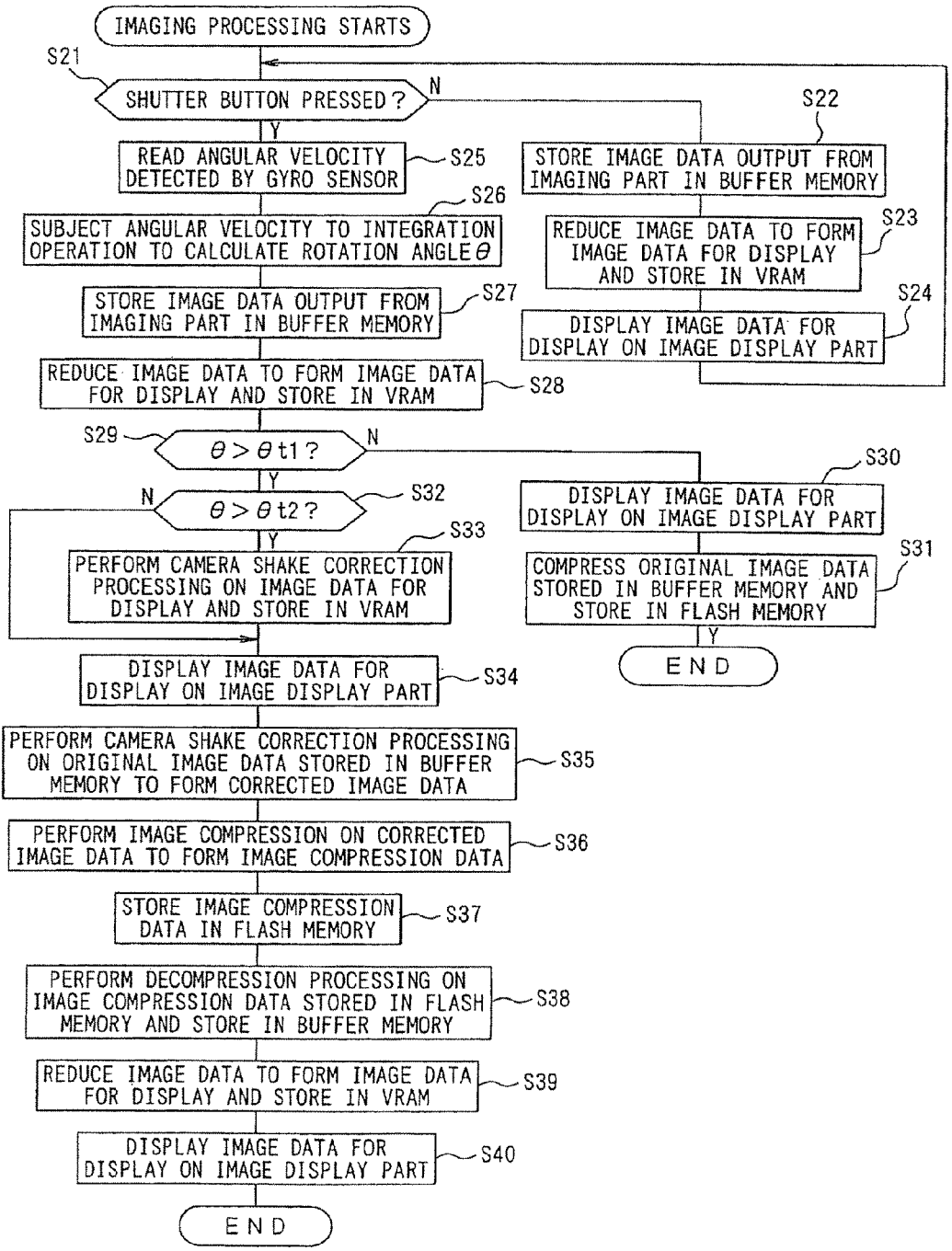
FIG. 7 is a flowchart showing another example of imaging procedures executed by the microcomputer in the second embodiment herein.

In this connection, although in the above second embodiment a case was described in which, when it is necessary to subject original image data to camera shake correction, the corrected original image data that underwent camera shake correction is stored as it is in the flash memory 15, this invention is not limited thereto. For example, as shown in FIG. 7, a configuration may be adopted in which the following steps S38 to S40 are added after the aforementioned step S37 of FIG. 6. In step S38, the corrected compressed image data that was stored in the flash memory 15 is read out by the image decompression part 16 to be decompressed in JPEG format and is then stored in the buffer memory 13. In step S39, the corrected image data that was stored in the buffer memory 13 is reduced to form image data for display, and this is then stored in the VRAM 17. Next, in step S40, the image data for display stored in the VRAM 17 is output to the image display part 8 to be displayed. Thus, image data for display formed by reducing the final corrected image data that underwent camera shake correction may be automatically displayed on the image display part 8 to allow the user to check the image data.

Figure 8:
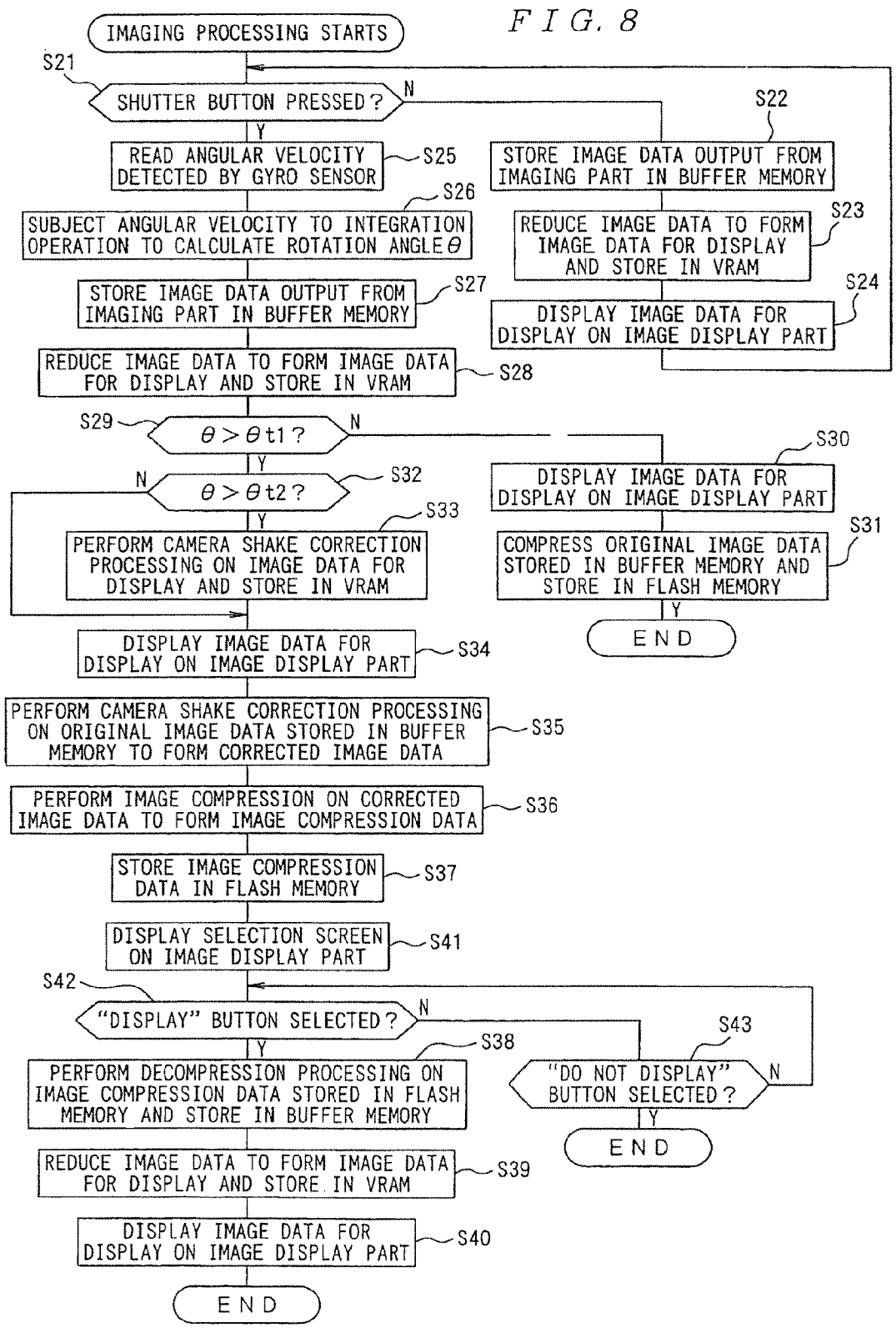
FIG. 8 is a flowchart showing a further example of imaging procedures executed by the microcomputer in the second embodiment herein.

Further, instead of a case of automatically displaying the final corrected image data that underwent camera shake correction, the following steps S41 to S43 may be added between steps S37 and S38, as shown in FIG. 8. In step S41, a selection screen is displayed that shows a "display" button and a "do not display" button for selecting whether or not to display the final corrected image data on the image display part 8. In step S42, the microcomputer 19 determines whether or not the "display" button was selected on the operation part 4. When the microcomputer 19 determines that the "display" button was selected in step S42, the processing moves to the step S38, and when it determines that the "display" button was not selected the processing moves to step S43. In step S43, the microcomputer 19 determines whether or not the "do not display" button was selected. When the "do not display" button was selected the image processing ends, and when the "do not display" button was not selected the processing returns to the step S42 to allow the user to select whether or not to check the final corrected image data that underwent camera shake correction.

In the above second embodiment, although a case was described of applying this invention to a portable telephone CT, the invention is not limited thereto, and it can also be applied to an independent imaging apparatus such as a digital camera or a portable device such as a PDA (Personal Digital Assistant).

Further, although in the above second embodiment a case was described in which a gyro sensor 11 was applied as an angular velocity detection part, this invention is not limited thereto, and a configuration may be adopted which applies a different kind of angular velocity sensor.

Furthermore, although in the above second embodiment a case was described in which a camera shake decision part determined whether or not camera shake occurred on the basis of angular velocity that was detected by an angular velocity detection part, this invention is not limited thereto, and a configuration may also be adopted in which a camera shake occurrence state is detected by subjecting image data to software processing to determine whether or not camera shake occurred.

What is claimed is:

1. An imaging apparatus comprising an imaging part that images a subject to generate image data, an image storage part that temporarily stores original image data that was imaged by the imaging part, an image data size reducing part that forms image data for display by reducing the size of image data stored in the image storage part, and an image display part that displays image data for display that was formed by the image data size reducing part;

the imaging apparatus further comprising an angular velocity detection part that detects an angular velocity of the imaging part, a camera shake decision part that decides whether or not camera shake occurred for image data that was imaged on the basis of an angular velocity that was detected by the angular velocity detection part, a first camera shake correction part that, when a result decided by the camera shake decision part is that a camera shake occurrence state exists, subjects image data for display that was formed by the image data size reducing part to camera shake correction and displays the resulting data on the image display part, and a second camera shake correction part that, while image data for display is displayed on the image display part by the first camera shake correction part, subjects the original image data to camera shake correction to form corrected image data.

2. The imaging apparatus according to claim 1, wherein the angular velocity detection part comprises a gyro sensor.

3. The imaging apparatus according to claim 2, wherein the gyro sensor is composed by a fixed substrate comprising a quadrate thin crystal plate, a pair of oscillatory arms for excitation that are disposed in parallel with one of the opposing sides of the fixed substrate through supporting parts, and oscillatory arms for detection that are provided in a connected row arrangement with the other opposing sides of the fixed substrate.

4. The imaging apparatus according to claim 1, wherein, when image data for display is subjected to camera shake correction and displayed on the image display part, the first camera shake correction part displays a camera shake correction mark indicating that camera shake correction was performed together with corrected image data for display.

5. The imaging apparatus according to claim 1, wherein, when camera shake correction of the original image data is finished, the second camera shake correction part supplies corrected image data that was formed to the image data size reducing part.

6. The imaging apparatus according to claim 1, wherein, when camera shake correction of the original image data is finished, the second camera shake correction part displays on the image display part a selection display to select whether or not to display corrected image data that was formed.

7. A portable device comprising the imaging apparatus according to claim 1.

8. A portable telephone comprising the imaging apparatus according to claim 1.

* * * * *